United States Patent
Kesiraju et al.

(10) Patent No.: US 10,776,125 B2
(45) Date of Patent: Sep. 15, 2020

(54) COPROCESSOR MEMORY ORDERING TABLE

(71) Applicant: Apple Inc., Cupertino, CA (US)

(72) Inventors: Aditya Kesiraju, Los Gatos, CA (US);
Brett S. Feero, Austin, TX (US);
Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 16/210,231

(22) Filed: Dec. 5, 2018

(65) Prior Publication Data
US 2020/0183736 A1 Jun. 11, 2020

(51) Int. Cl.
*G06F 9/38* (2018.01)
*G06F 12/0815* (2016.01)
*G06F 12/084* (2016.01)

(52) U.S. Cl.
CPC ......... *G06F 9/3877* (2013.01); *G06F 12/084* (2013.01); *G06F 12/0815* (2013.01)

(58) Field of Classification Search
CPC .............................. G06F 9/3877; G06F 12/084
See application file for complete search history.

(56) References Cited

U.S. PATENT DOCUMENTS

| | | | |
|---|---|---|---|
| 5,724,536 A * | 3/1998 | Abramson | G06F 9/30043 712/216 |
| 6,219,761 B1 * | 4/2001 | Movall | G06F 9/3879 710/22 |
| 7,930,519 B2 | 4/2011 | Frank | |
| 8,612,955 B2 | 12/2013 | Oskin et al. | |
| 9,740,615 B2 | 8/2017 | Bradbury et al. | |
| 2006/0161420 A1 * | 7/2006 | Sugawara | G06F 9/3879 703/26 |
| 2009/0198908 A1 * | 8/2009 | Arimilli | G06F 9/30087 711/137 |
| 2017/0185517 A1 * | 6/2017 | Guim Bernet | G06F 12/0833 |

* cited by examiner

*Primary Examiner* — Jyoti Mehta
(74) *Attorney, Agent, or Firm* — Kowert, Hood, Munyon, Rankin & Goetzel, P.C.; Lawrence J. Merkel

(57) ABSTRACT

In an embodiment, at least one CPU processor and at least one coprocessor are included in a system. The CPU processor may issue operations to the coprocessor to perform, including load/store operations. The CPU processor may generate the addresses that are accessed by the coprocessor load/store operations, as well as executing its own CPU load/store operations. The CPU processor may include a memory ordering table configured to track at least one memory region within which there are outstanding coprocessor load/store memory operations that have not yet completed. The CPU processor may delay CPU load/store operations until the outstanding coprocessor load/store operations are complete. In this fashion, the proper ordering of CPU load/store operations and coprocessor load/store operations may be maintained.

20 Claims, 10 Drawing Sheets

|  | | Older | | | |
|---|---|---|---|---|---|
|  | | CPU Ld | CPU St | COP Ld | COP St |
| Younger | CPU Ld | Managed by LSU 50 | | Flush CPU Ld that has forwarded Data (LDQ)<br><br>Replay CPU Ld that Hits MOT 54 | |
| | CPU St | | | Stall CPU St that Hits MOT in STQ 56 | |
| | COP Ld | Stall COP Ld/St in STQ Until Older CPU Lds Completed from LDQ 58 | Stall COP Ld/St Until Older CPU Sts Performed from StQ (CIF stall transfer to COP for NC CPU St) 60 | Managed by Coprocessor 52 | |
| | COP St | | | | |

Fig. 3

COPROCESSOR MEMORY ORDERING TABLE

BACKGROUND

Technical Field

Embodiments described herein are related to memory ordering between processors and coprocessors in a system.

Description of the Related Art

Computing systems generally include one or more central processing unit (CPU) processors that perform the bulk of the computing in the system. Typically, an operating system executed by the CPU processors controls the access of various programs (also executed on the CPU processors) to various system resources such as memory, peripherals, etc. Accordingly, CPU processors are typically general purpose processors that are optimized for general purpose instruction execution.

In some cases, the CPU processors are supplemented by coprocessors that are optimized for certain specific tasks. The coprocessors can perform the specific tasks with higher performance and/or more efficiently than the CPU processors would be able to perform the tasks. The CPU processor instruction set can include one or more instructions that are executed by the coprocessor, and the CPU processor is designed to transmit such instructions to the coprocessor for execution if the coprocessor is present in the system.

While such configurations can lead to higher performance and/or efficiency, the presence of the coprocessor can also present challenges. One challenge occurs if the coprocessor includes load/store operations to access memory locations. The CPU processors also include load/store operations. If CPU load/store operations and coprocessor load/store operations both access the same memory locations, a mechanism for ordering the accesses so that consistent execution occurs is needed.

SUMMARY

In an embodiment, at least one CPU processor and at least one coprocessor are included in a system. The CPU processor may issue operations to the coprocessor, including load/store operations. The CPU processor may generate the addresses that are accessed by the coprocessor load/store operations, as well as executing its own CPU load/store operations. The CPU processor may include a memory ordering table configured to track at least one memory region within which there are outstanding coprocessor load/store memory operations that have not yet completed. The CPU processor may delay CPU load/store operations until the outstanding coprocessor load/store operations are complete. In this fashion, the proper ordering of CPU load/store operations and coprocessor load/store operations may be maintained.

In an embodiment, the memory region or regions tracked in the memory ordering table may be somewhat large (e.g. 16 kilobytes in size, or the size of a page in the address translation mechanism used in the system). Large regions may be used because interaction between CPU load/store operations and coprocessor load/store operations may be expected to be infrequent. For example, CPU load/store operations may be used to initialize data on which the coprocessor is to operate. The program may then include coprocessor load/store instructions and coprocessor compute instructions to operate on the data. During the operation by the coprocessor, the CPU processor may operate on other data and/or may continue issuing operations to the coprocessor, and thus may not be directly accessing the data being operated on by the coprocessor. When the coprocessor has completed processing on the data, the program may include CPU load/store operations to read the results and perform further processing. Thus, interaction between CPU load/store operations and coprocessor load/store operations may be infrequent (e.g. brief times during hand off after initialization or after coprocessor completion, but otherwise little interaction). However, if there is interaction, the memory ordering table may ensure the correct order of the accesses.

BRIEF DESCRIPTION OF THE DRAWINGS

The following detailed description makes reference to the accompanying drawings, which are now briefly described.

FIG. 3 is a matrix indicating ordering between CPU load/store operations and coprocessor load/store operations, for an embodiment.

Figure 1:
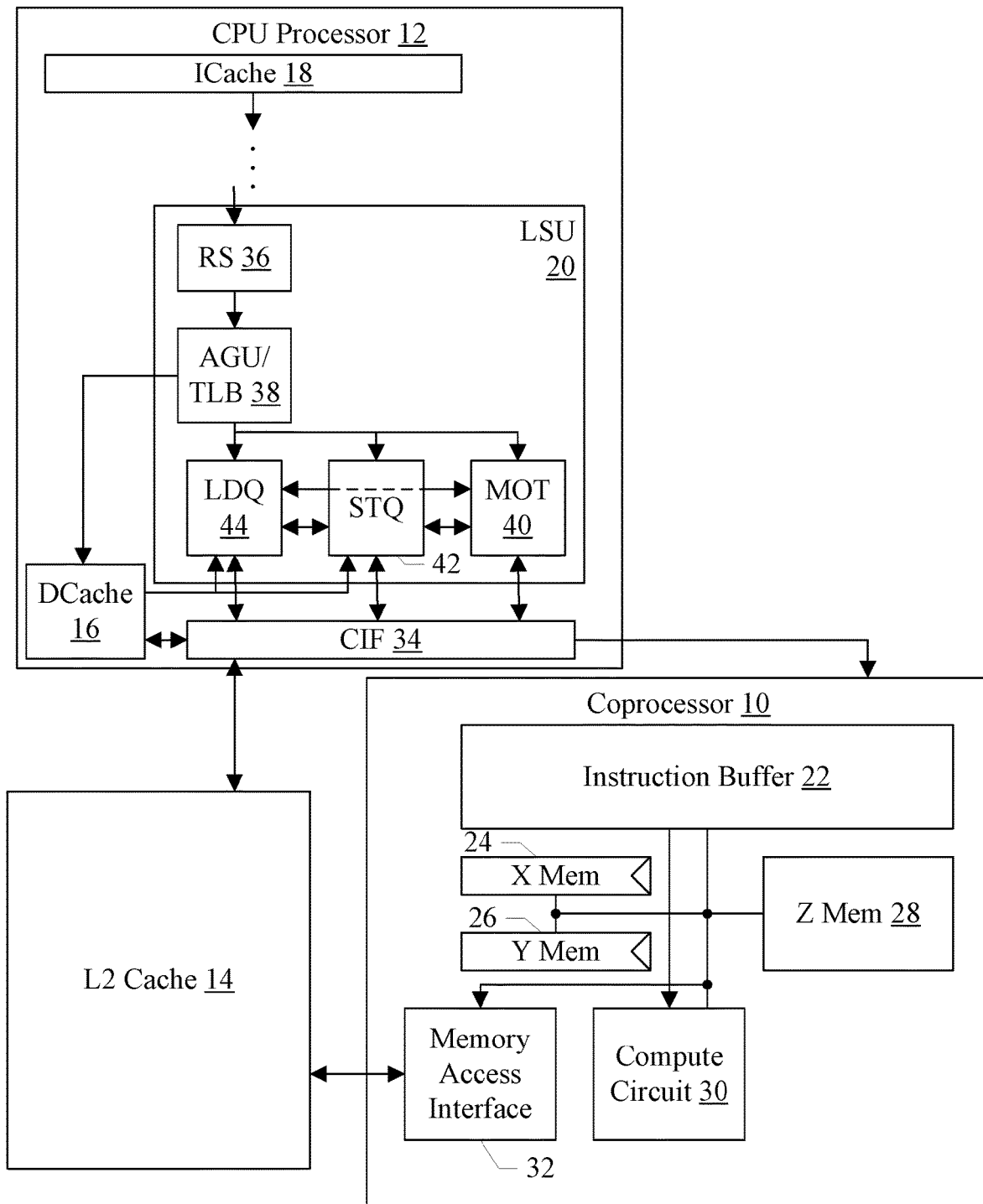
FIG. 1 is a block diagram of one embodiment of a central processing unit (CPU) processor, a coprocessor, and a level two (L2) cache shared by the CPU processor and the coprocessor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of an apparatus including a CPU processor 12, a coprocessor 10, and a level two (L2) cache 14 is shown. In the illustrated embodiment, the CPU processor 12 is coupled to the L2 cache 14 and the coprocessor 10. In some embodiments, the coprocessor 10 may be coupled to the L2 cache 14 as well, and/or may be coupled to a data cache (DCache) 16 in the CPU processor 12 (not shown in FIG. 1). The CPU processor 12 may further include an instruction cache (ICache) 18 and one or more pipeline stages (illustrated as the ellipses in FIG. 1, along with the load/store unit 20 which may implement one or more pipeline stages of the pipeline). The coprocessor 10 may include an instruction buffer 22, an X memory 24, a Y memory 26, a Z memory 28, a compute circuit 30, and a memory access interface 32 coupled to each other. The CPU processor 20 may include the LSU 20 coupled to the DCache 16 and a core interface circuit (CIF) 34. The CIF is further coupled to the coprocessor 10, the L2 cache 14, and the DCache 16. The LSU 20 may include a reservation station (RS) 36, an address generation unit (AGU)/translation lookaside buffer (TLB) 38, a load queue (LDQ) 44, a store queue (STQ) 42, and a memory ordering table (MOT) 40. The reservation station 36 is coupled to a preceding pipeline state to receive load/store operations, operand addresses, and other related data and is coupled to the AGU/TLB 38. The AGU/TLB 38 is coupled to the DCache 16, the LDQ 44, the STQ 42, and the memory ordering table 40. The LDQ 44 and STQ 42 are coupled to the DCache 16, the CIF 34, and the memory ordering table 40. The memory ordering table 40 is further coupled to the CIF 34. In some embodiments, circuits may be coupled if they are electrically coupled (e.g. directly connected or indirectly connected through one or more other circuits) and/or communicatively coupled.

The coprocessor 10 may be configured to perform one or more computation operations and one or more coprocessor load/store operations. The coprocessor 10 may employ an instruction set, which may be a subset of the instruction set implemented by the CPU processor 12. The CPU processor 12 may recognize instructions implemented by the coprocessor 10 and may communicate the instructions to the coprocessor 10.

More particularly, the CPU processor 12 may be configured to transmit the coprocessor instructions/operations to the coprocessor 10 through the STQ 42 and the CIF 34, in an embodiment. In one embodiment, the coprocessor computation operations may be handled like CPU store operations in the CPU processor 12 until they reach the STQ 42 (except that the operations may not include an address generation/translation in the AGU/TLB 38, in some embodiments, and may not access the DCache 16, in some embodiments). The coprocessor computation operations may be issued from the STQ 42 when no longer speculative, and may be transmitted through the CIF to 34 to the coprocessor 10.

Coprocessor load/store operations may also be handled like CPU store operations in the CPU processor 12 until they reach the STQ 42, in an embodiment. The coprocessor load/store operations may include an address generation and translation by the AGU/TLB 38 as well, allowing the addresses accessed by the coprocessor load/store operations to be known prior to issuance of the coprocessor load/store operations to the coprocessor 10. The CPU processor 12 may use the coprocessor load/store addresses and addresses of CPU load/store operations to order CPU load/store operations and coprocessor load/store operations, even though the coprocessor load/store operations are actually executed in the coprocessor 10, independent of the CPU processor 12 once issued to the coprocessor 10.

Generally, CPU load/store operations and coprocessor operations may be received in the reservation station 36, which may be configured to monitor the source operands of the operations to determine when they are available and then issue the operations to the AGU/TLB 38. Some source operands may be available when the operations are received in the reservation station 36, which may be indicated in the data received by the reservation station 36 for the corresponding operation. Other operands may become available via execution of operations by other execution units (e.g. integer execution units, floating point execution units, etc. not shown in FIG. 1). The operands may be gathered by the reservation station 36, or may be read from a register file (not shown in FIG. 1) upon issue from the reservation station 36.

In an embodiment, the reservation station 36 may be configured to issue operations out of order (from their original order in the code sequence being executed by the CPU processor 12, referred to as "program order") as the operands become available. To ensure that there is space in the LDQ 44 or the STQ 42 for older operations that are bypassed by younger operations in the reservation station 36, an earlier pipeline stage in the CPU processor 12 may include circuitry that preallocates LDQ 44 or STQ 42 entries to operations transmitted to the load/store unit 20. For example, a register rename stage may assign rename registers to the architected registers specified in various instructions fetched by the CPU processor 12. The register rename stage may include allocation of LDQ 44 or STQ 42 entries. Particularly, in one embodiment, CPU load operations may be assigned LDQ 44 entries and CPU store operations and coprocessor operations (load, store, and computation) may be assigned STQ 42 entries. In other embodiments, the reservation station 36 may issue operations in program order and LDQ 44/STQ 42 assignment may occur at issue from the reservation station 36.

It is noted that, for coprocessor operations, the source operands that are determined as available by the reservation station 36 may be operands that are stored in the CPU processor 12. For example, the address operand(s) of the coprocessor load/store operations (which specify the address accessed by the load/store operations) may be stored in CPU registers (e.g. integer registers). The data source for a coprocessor store operation may be in the coprocessor 10 and may not be tracked by the reservation station 36. Similarly, computation operations may have a CPU register (e.g. integer register) which specifies additional information about the instruction, in an embodiment, but the operands of the computation operation itself may be stored in the coprocessor 10 and may not be tracked in the reservation station 36.

The AGU/TLB 38 may be configured to generate the address accessed by a load/store operation, and translate the address from an effective or virtual address created from the address operands of the load/store operation to a physical address actually used to address memory. The AGU/TLB 38 may be configured to generate an access to the DCache 16 for CPU load/store operations. For CPU load operations, data may be speculatively forwarded from the DCache 16 to the destination operand of the CPU load operation (e.g. a register in the CPU processor 12, not shown in FIG. 1), unless the address hits a preceding operation in the STQ 42 (that is, an older CPU store or coprocessor load/store operation in program order) or hits a memory region in the memory ordering table 40, as discussed in more detail below. The cache hit/miss status from the DCache 16 may be logged for CPU store operations in the STQ 42 for later processing.

The CPU load operations may be written to the LDQ 44, and the CPU store operations and coprocessor load/store operations may be written to the STQ 42, to enforcing ordering among operations. The coprocessor computation operations may be ordered in the STQ 42 as well for program order, but may not have memory ordering considerations. In one embodiment, the instruction set architecture implemented by the CPU processor 12 and the coprocessor 10 may permit memory accesses to different addresses to occur out of order but may require memory accesses to the same address (or overlapping addresses, where at least one byte is accessed by both overlapping memory accesses) to occur in program order.

The memory ordering table 40 may be configured to track outstanding coprocessor load/store operations. A coprocessor load/store operation may be "outstanding" if it has been issued by the CPU processor 12 from the STQ 42 to the coprocessor 10 (including if it is in the CIF 34 awaiting transfer to the coprocessor 10 or in any other pipeline stage of the CPU processor 12 subsequent to issuance from the STQ 42) and has not been completed by the coprocessor 10. A memory operation may be completed by the coprocessor 10 when the data has been transferred between a location in one of the memories 24, 26, and 28 and main memory, although the transfer may be completed via a cache such as the L2 cache 14, another cache between the L2 cache 14 and main memory, or main memory itself.

In an embodiment, the memory ordering table 40 may be configured to track outstanding coprocessor load/store operations based on one or more memory regions that include the address accessed by the coprocessor load/store operations. The memory region may be a contiguous range of memory addresses that encompasses multiple cache lines of the caches in the system. For example, the memory region may be a page of memory, where the page size may be the size of a page translated by a given translation in the address translation mechanism used by the CPU processor 10 (e.g. the translation mechanism implemented in the TLB within the AGU/TLB 38 and related table walking circuitry when a TLB miss occurs). The page size may vary in various embodiments. For example, a 16 kilobyte page may be used. Other embodiments may user larger or smaller page sizes (e.g. 4 kilobytes, 8 kilobytes, 1 Megabyte, 2 Megabytes, etc.). Any page size may be used in an embodiment. In other embodiments, a memory region may be larger than a cache line but smaller than a page, or may be multiple pages. In still other embodiments, a memory region may be a cache line.

For CPU load/store operations, the memory ordering table 40 may be consulted to detect if there are potentially outstanding coprocessor load/store operations to the same address. Since the memory ordering table 40 tracks memory regions, it is possible that a potential ordering issue may be detected if addresses are in the same region by not actually overlapping. However, since ordering issues are expected to be rare between CPU load/store operations and coprocessor load/store operations, the performance impact of over-detecting ordering issues may be relatively small. Additionally, correct ordering in cases in which there is an overlap in the operations is provided.

The memory ordering table 40 may be consulted for CPU load/store operations in parallel with checking for CPU load/store ordering. That is, CPU load operations may check the STQ 42 for ordering issues, and may check the memory ordering table 40 in parallel. If an ordering issue is detected, corrective action may be taken to ensure the CPU load is performed in order. Similarly, CPU store operations may be issued from the STQ 42 and may check the LDQ 44 and the memory ordering table 40 for potential ordering issues.

Coprocessor load/store operations may also be issued from the STQ 42, and may consult the LDQ 44 for potential ordering issues. However, the coprocessor load/store operations need not consult the memory ordering table 40 for ordering, as the coprocessor 10 may be responsible for the ordering among coprocessor load/store operations. On the other hand, the coprocessor load/store operations may update the memory ordering table 40 when issued from the STQ 42, so that the coprocessor load/store operations may be tracked by the memory ordering table 40.

In one embodiment, the computation operations specified by the instructions implemented in the coprocessor 10 may be performed on vectors of input operands. For example, an embodiment receives vectors of operands from the X memory 24 and the Y memory 26. The compute circuit 30 may include an array of compute elements (circuits) to perform the operations. Each circuit may receive a vector of elements from the X memory 24 and a vector of elements from the Y memory 26, and may evaluate the operation on the vector elements. In an embodiment, the result of the operation may be accumulated with the current value in a corresponding location in the Z memory 28, for write back to the corresponding location in the Z memory 28. In an embodiment, the coprocessor 10 may also support a matrix mode for the compute instructions. In the matrix mode, an outer product of the input vector operands may be computed.

In an embodiment, the coprocessor 10 may support various data types and data sizes (or precisions). For example, floating point and integer data types may be supported. The floating point data type may include 16 bit, 32 bit, and 64 bit precisions. The integer data types may include 8 bit and 16 bit precisions, and both signed and unsigned integers may be supported. Other embodiments may include a subset of the above precisions, additional precisions, or a subset of the above precisions and additional precisions (e.g. larger or smaller precisions).

In an embodiment, the coprocessor load operations may transfer vectors from a system memory (not shown in FIG. 1) to the X memory 24, Y Memory 26, or Z memory 28. The coprocessor store operations may write the vectors from the X and Y memories 24 and 26 to system memory. The Z memory 28 may be written to memory using an extract instruction to move the results to the X memory 24 and/or the Y memory 26, and then storing the results from the X memory 24 and/or the Y memory 26 to system memory. Alternatively, a store instruction to store the Z memory 28 to main memory may also be supported. The system memory may be a memory accessed at a bottom of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the coprocessor 10 may be cache coherent with the CPU processor 12. In an embodiment, the coprocessor 10 may have access to the L2 cache 14, and the L2 cache 14 may ensure cache coherency with the data cache 16. In yet another alternative, the coprocessor 10 may have access to the memory system, and a coherence point in the memory system may ensure the coherency of the accesses. In yet another alternative, the coprocessor 10 may have access to the caches 14 and 16. Any mechanism for accessing memory and ensuring coherency may be used in various embodiments.

Similarly, CPU load operations may specify transfer of data from a memory location to the CPU processor 12 (e.g. a register target in the CPU processor 12). CPU store operations may specify the transfer of data from the CPU processor 12 to a memory location. Each load/store operation (whether CPU or coprocessor) may include one or more address operands specified by the corresponding instruction that may be added to produce the effective or virtual memory address of the memory location accessed by the load/store operation. The address operands may include immediate operands, operands stored in a CPU register, etc. The virtual address may then be translated to a physical address through the address translation mechanism, represented by the TLB.

As mentioned previously, the CPU processor 12 is responsible for fetching the instructions executed by the CPU processor 12 and the coprocessor 10, in an embodiment. The CPU processor 12 may be configured to decode instructions into operations. In some embodiments, there may be a one-to-one correspondence between instructions and operations (e.g. a given instruction may decode into one operation). In such cases, instruction and operation may be effectively synonymous, although the operation may be modified in form by the decoder or other circuitry in the CPU processor 12. In other embodiments, at least some instructions may be decoded into multiple operations. The multiple operations, when executed, may implement the operation specified for the corresponding instructions. Combinations of instructions which decode one-to-one and instructions which decode one-to-multiple may be supported in an embodiment. Some instructions may be microcoded as well, in an embodiment. Thus, load/store operations may be instructions, or may be one of the operations decoded from a given instruction.

In an embodiment, operations may be issued from the STQ 42 when they are no longer speculative. Generally, an instruction or operation may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the CPU processor 12 and the instruction itself is also known not to cause an exception/speculative flush. Some instructions may be known not to cause exceptions based on the instruction set architecture implemented by the CPU processor 12 and may also not cause speculative flushes. Once the other prior instructions have been determined to be exception-free and flush-free, such instructions are also exception-free and flush-free.

Since coprocessor operations are passed through the STQ 42, they may be non-speculative when issued from the STQ 42 and thus are known to be exception/flush-free when transmitted to the coprocessor 10. The coprocessor 10 may be configured to execute operations in program order or out of order, in various embodiments. In one embodiment, the coprocessor 10 may execute load/store operations out of order unless they access the same address, or an overlapping address as mentioned above.

FIG. 1 illustrates a communication path between the CPU processor 12 and the coprocessor 10 through the CIF 34. The path may be a dedicated communication path, for example if the coprocessor 10 is physically located near the CPU processor 12. The communication path may be shared with other communications. For example, a packet-based communication system could be used to transmit memory requests to the system memory and instructions to the coprocessor 10.

The instruction buffer 22 may be provided to allow the coprocessor 10 to queue instructions while other instructions are being performed. In an embodiment, the instruction buffer 22 may be a first in, first out buffer (FIFO). That is, instructions may be processed in program order. Other embodiments may implement other types of buffers, multiple buffers for different types of instructions (e.g. load/store instructions versus compute instructions) and/or may permit out of order processing of instructions.

The X memory 24 and the Y memory 26 may each be configured to store at least one vector of input operands. Similarly, the Z memory 28 may be configured to store at least one computation result. The result may be an array of results at the result size (e.g. 16 bit elements or 32 bit elements). In some embodiments, the X memory 24 and the Y memory 26 may be configured to store multiple vectors and/or the Z memory 28 may be configured to store multiple result vectors. Each vector may be stored in a different bank in the memories, and operands for a given instruction may be identified by bank number. More generally, each entry in the memories 24, 26, and 28 may be addressed by a register address (e.g. register number) and thus the entries in the memories may be viewed as registers, similar to an integer or floating point register in the CPU processor 12 (although generally significantly larger than such a register in terms of storage capacity). Viewed in another way, each of the memories 24, 26, and 28 may be addressable as entries using addresses that are referenced to the particular memory (e.g. each memory 24, 26, and 28 may have its own address space). A given address of a given entry in the X memory 24, for example, may have the same numerical value as a second given address of a second given entry in the Y memory 26. Because they are coded in a given instruction as an X memory address or a Y memory address, the correct entry from the correct memory to be read/written may be selected by the coprocessor 10.

The compute circuit 30 may be configured to perform the computation operations, as previously mentioned. The memory access interface 32 may be configured to perform the coprocessor load/store operations. The coprocessor 10 may provide the coprocessor load/store operations from the instruction buffer 22 to the memory access interface 32, which may include a queue for the load/store operations and control logic to select the load/store operations for execution. The address of the coprocessor load/store operations may be provided with the operation from the CPU processor 12, as previously noted. However, for coprocessor store operations, the source data from one of the memories 24, 26, and 28 may not be available until prior compute operations have been completed. Coprocessor load operations may generally be ready for execution when provided to the memory access interface 32, but may have ordering constraints with younger coprocessor load/store operations. The memory access interface 32 may be configured to resolve the ordering constraints and transmit the memory operations to the L2 cache 14.

In an embodiment, the L2 cache 14 may be configured to check for a cache hit for the coprocessor load/store operations, and may also determine if the data (or a portion thereof) accessed by the coprocessor load/store operations is in the DCache 16. The L2 cache 14 may be inclusive of the DCache 16, and thus the tag for the cache line in the L2 cache 14 may indicate if the cache line is in the DCache 16. Alternatively, the L2 cache 14 may include a set of tags for the DCache 16 and may track which cache blocks are in the DCache 16 in the set of tags. If the data is in the DCache 16, the L2 cache 14 may generate an operation to invalidate the DCache 16 cache line (and fetch the data if it is modified). This operation may be referred to as a "back snoop" operation. Additionally, the L2 cache 14 may detect a cache miss for a coprocessor load/store operation, and may fetch the missing cache line from another lower level cache or the main memory to complete the request.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes (e.g. the DCache 16 may have a smaller cache line size than the L2 cache 14, in an embodiment). The instruction cache 18 and data cache (DCache) 16 may each be a cache having any desired capacity, cache line size, and configuration. Similarly, the L2 cache 14 may be any capacity, cache line size, and configuration. The L2 cache 14 may be any level in the cache hierarchy (e.g. the last level cache (LLC) for the CPU processor 12, or any intermediate cache level between the CPU processor 12/coprocessor 10 and the main memory system). There may be more levels of cache between the CPU DCache 16/ICache 18 and the L2 cache 14, and/or there may be additional levels of cache between the L2 cache 14 and the main memory.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

It is noted that the coprocessor 10 may be illustrated in simplified form, in an embodiment, and may include additional components not shown in FIG. 1. For example, the coprocessor 10 may include a pipeline to decode coprocessor operations, perform register renaming the operands, use a physical memory size for the X memory 24 and Y memory 26 that is larger than the architected size, and execute computation operations out of order. Any implementation of the coprocessor 10 may be used in various embodiments.

It is noted that, in some embodiments, the coprocessor 10 may be shared by multiple CPU processors 12. The coprocessor 10 may maintain separate contexts in the X memory 24, Y memory 26, and Z memory 28 for each CPU processor 12, for example. Alternatively, contexts may be swapped in the coprocessor 10 when different CPU processors 12 issue coprocessor operations to the coprocessor 10.

Figure 2:
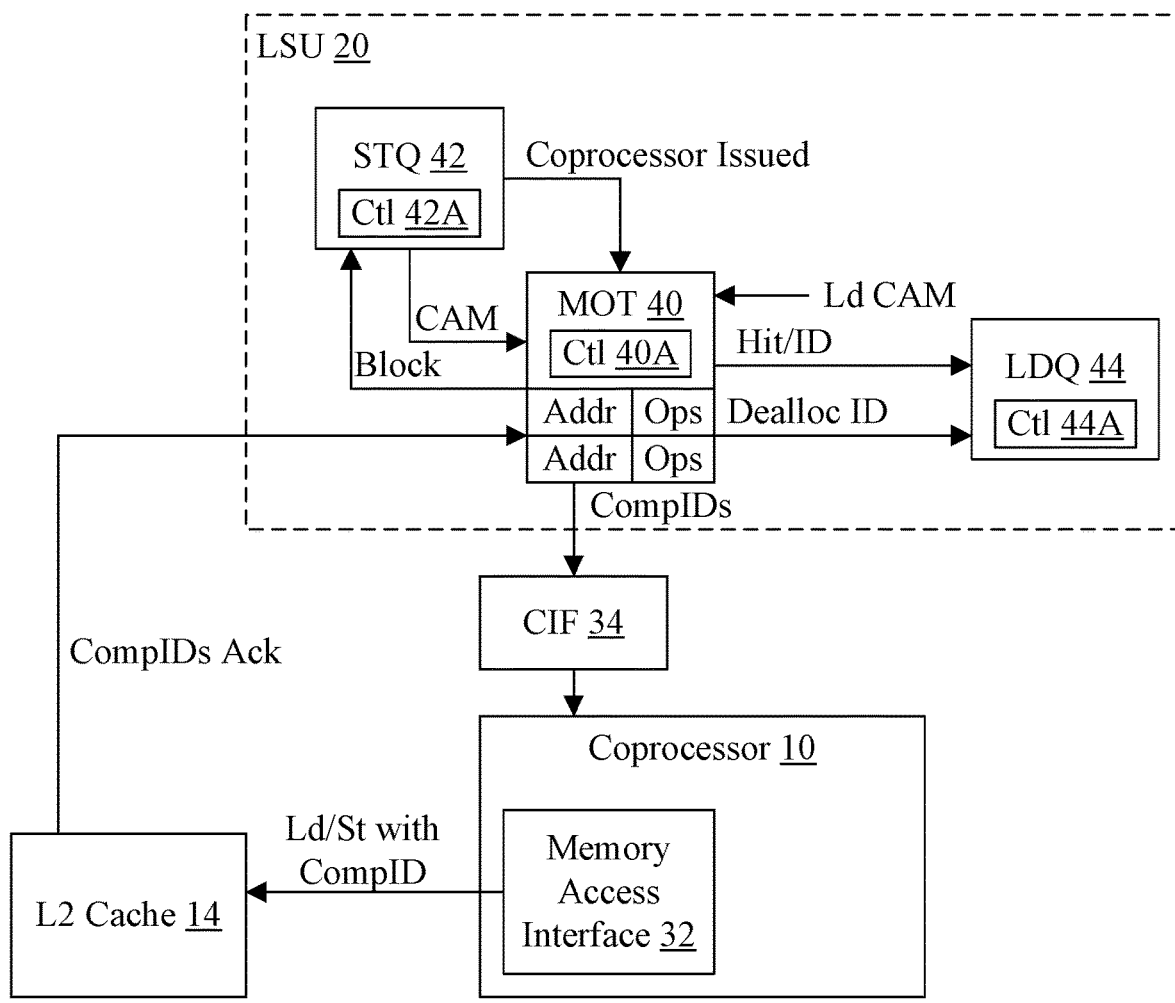
FIG. 2 is a block diagram of certain components shown in FIG. 1 illustrated in greater detail, for an embodiment.

FIG. 2 is a block diagram illustrating certain communication among the LSU 20, the coprocessor 10, and the L2 cache 14 in greater detail for one embodiment of the ordering mechanism described herein. Furthermore, additional detail for an embodiment of the STQ 42, the memory ordering table 40, and the LDQ 44 is shown in greater detail in FIG. 2 as well. Other communication may be provided as well for other purposes, the communication illustrating in FIG. 2 is primarily related to the ordering mechanism.

As illustrated in FIG. 2, the memory ordering table 40 may be coupled to one or more load content addressable memory (CAM) inputs (e.g. from the AGU/TLB 38, in an embodiment). For each Ld CAM input, there may be a corresponding hit/identifier (ID) output for the LDQ 44. Additionally, there may be a deallocation ID output from the memory ordering table 40 to the LDQ 44. The STQ 42 may have one or more CAM inputs to the memory ordering table 40, and may provide corresponding block outputs to the STQ 42. STQ 42 may also have one or more coprocessor issued inputs to the memory ordering table 40, and may provide one or more completion IDs to the CIF 34 to transmit with the coprocessor load/store operations to the coprocessor 10. The memory access interface circuit 32 may be configured to transmit one or more coprocessor load/store operations (with corresponding completion IDs) to the L2 cache 14, which may return the completion IDs as acknowledgements (Comp IDs Ack) to the memory ordering table 40.

The memory ordering table 40 may include one or more entries. Two exemplary entries are shown in FIG. 2, but any number of entries may be included. Each entry may track a memory region having one or more outstanding coprocessor load/store operations in the region. Thus, the entry may include an address that identifies the region (Addr) and an indication of the outstanding coprocessor operations (Ops). The address may be the base address of the region, and least significant bits that define an offset within the region may be omitted. For example, if a page size of 16 kilobytes is used, the least significant 14 bits of the address may be omitted. The ops indication may be any indication of the outstanding coprocessor load/store operations. For example, the ops indication may be a count that may be incremented for each outstanding operation and decremented for each completed operation. When the count is reduced to zero, the region may be deallocated from the memory ordering table 40 since no additional coprocessor load/store operations are outstanding in the region. Other embodiments may employ a per-cache line indication such as a bit, or a list of outstanding coprocessor load/store operations. Any indication may be used.

When CPU load operations are being executed (address generated and translated through the AGU/TLB 38), the CPU load operations may be presented on the Ld CAM inputs to the memory ordering table 40. The memory ordering table 40 may compare the CPU load addresses to the memory ordering table entries, and if a hit is detected the memory ordering table 40 may signal the hit and provide an identifier of the entry (e.g. an entry number) to the LDQ 44. If the CPU load is a hit in the DCache 16, forwarding of the load data may be cancelled and the CPU load may be written to the LDQ 44, tagged with the memory ordering table ID. The LDQ 44 may wait for the memory ordering table 40 entry to be deallocated (indicating that no more coprocessor load/store operations are outstanding to the region), which the memory ordering table 40 may communicate via the deallocation ID. The LDQ 44 may permit the load to be reexecuted once the deallocation ID matching the load's ID is received.

CPU store operations may wait until they are the oldest operation in the STQ 42, and may CAM the memory ordering table 40. If the store address is a hit in the memory ordering table 40, the memory ordering table 40 may return a block response to the STQ 42. The STQ 42 may stall on the oldest store until the CAM returns a non-blocked response (i.e. when the entry in the memory ordering table 40 deallocates).

When the STQ 42 issues coprocessor load/store operations, the STQ 42 may transmit the operations on the coprocessor issued input to the memory ordering table 40. The memory ordering table 40 may update the entry corresponding to the region that includes the coprocessor load/store operation's address (e.g. incrementing the count) or may allocate an entry to the memory region if the coprocessor load/store operation's address does not match the regions being tracked in the memory ordering table 40. The ID for the entry may be provided as a completion ID for the coprocessor load/store operation to the CIF 34, which may transmit the completion ID with the coprocessor load/store operation to the coprocessor 10. The coprocessor 10 may transmit the coprocessor load/store operations to the memory access interface 32, which may execute the coprocessor load/store operations as they become ready (and respecting order for coprocessor load/store operations to the same/overlapping addresses). The coprocessor 10 may transmit the coprocessor load/store operations to the L2 cache 14 with the corresponding completion ID. The L2 cache 14 may complete the coprocessor load/store operation (returning data to the coprocessor 10 for a load or updating the memory location accessed by a store), and may return the completion ID with an acknowledgement (Ack) to the memory ordering table 40. The completion ID ack may actually be provided through the CIF 34, in an embodiment. The memory ordering table 40 may update the entry indicated by the completion ID, decrementing the count and deallocating the entry if the count is exhausted (zero).

The above discussion has described the LDQ 44, STQ 42, and memory ordering table 40 performing various operations in this discussion. Each of the LDQ 44, STQ 42, and memory ordering table 40 may include control logic circuitry (e.g. illustrated as control logic 44A, 42A, and 40A, respectively in FIG. 2) implementing the operations. Alternatively, the control logic circuitry may be separate from the queues/table, or implemented in any other desired fashion.

FIG. 3 is a matrix illustrating the ordering rules for one embodiment of the CPU processor 12/coprocessor 10 for CPU load/store operations and coprocessor (COP) load/store operations, for an embodiment. The older operation is listed across the top of the matrix, while the younger operation is listed on the left hand side. Ordering issues between CPU load/store operations (block 50) may be managed in any desired fashion. For example, ordering requirements may be determined based on an overlapping address basis, with the older load/store being ordered ahead of the younger load/store. Similarly, ordering issues between coprocessor load/store operations (block 52) may be handled within the coprocessor 10 in any desired fashion, based on overlapping addresses.

For the ordering between CPU load/store operations and coprocessor load/store operations, ordering may be determined based on addresses in the same region. The remaining blocks in FIG. 3 illustrate the cases. For a younger CPU load operation to the same region as an older coprocessor load/store operation (block 54), there are two possibilities: the CPU load executed speculatively before the older coprocessor load/store operation and forwarded data. This case may be detected when the older coprocessor load/store is subsequently transmitted from the STQ 42 (to the CIF 34 to go to the coprocessor 10) and compares to the LDQ 44. The younger CPU load operation may be flushed in this case, causing the CPU load operation and subsequent operations to be fetched again by the CPU processor 12 and processing restarted for those operations (discarding previous results). The second case is that the older coprocessor load/store executes first, in which case the CPU load operation may hit in the memory ordering table when executed. The CPU load operation may be replayed for this case, enqueuing in the LDQ 44 with the ID from the matching entry of the memory ordering table 40 and waiting for the matching deallocation ID before attempting execution again. For a younger CPU store operation to the same region as an older coprocessor load/store operation may be managed as shown in block 56. Since the CPU store operation is performed when it is oldest in the STQ 42 in this embodiment, there is one case: the CPU store operation hits the memory ordering table 40. The CPU store operation may be stalled until the hit in the memory ordering table 40 clears (by deallocating the corresponding memory region).

For coprocessor load/store operations that are younger than a CPU load operation in the same region (block 58), the coprocessor load/store operation may be attempted when it is oldest in the STQ 42 (similar to the CPU store operation described above). The coprocessor load store operation may CAM the LDQ 42 and detect the older CPU load operation to the same region. The STQ 42 may stall the coprocessor load/store operation until the older CPU load is completed from the LDQ 44. Similarly, for coprocessor load/store operations that are younger than a CPU store operation (block 60), the coprocessor load/store operations may be behind the older CPU store operation in the STQ 42 and may be stalled by the STQ 42 until the older CPU store operation has issued from the STQ 42. In some cases, the older store may still not be complete. For example, a store operation that is a cache miss may be in the CIF 34 to update the L2 cache 14 or to proceed further in the memory hierarchy. In another example, a non-cacheable store may be in the CIF 34. The younger coprocessor load/store operation may continue to stall until the younger CPU store completes prior to transmitting the younger coprocessor load/store operation to the coprocessor 10.

Figure 4:
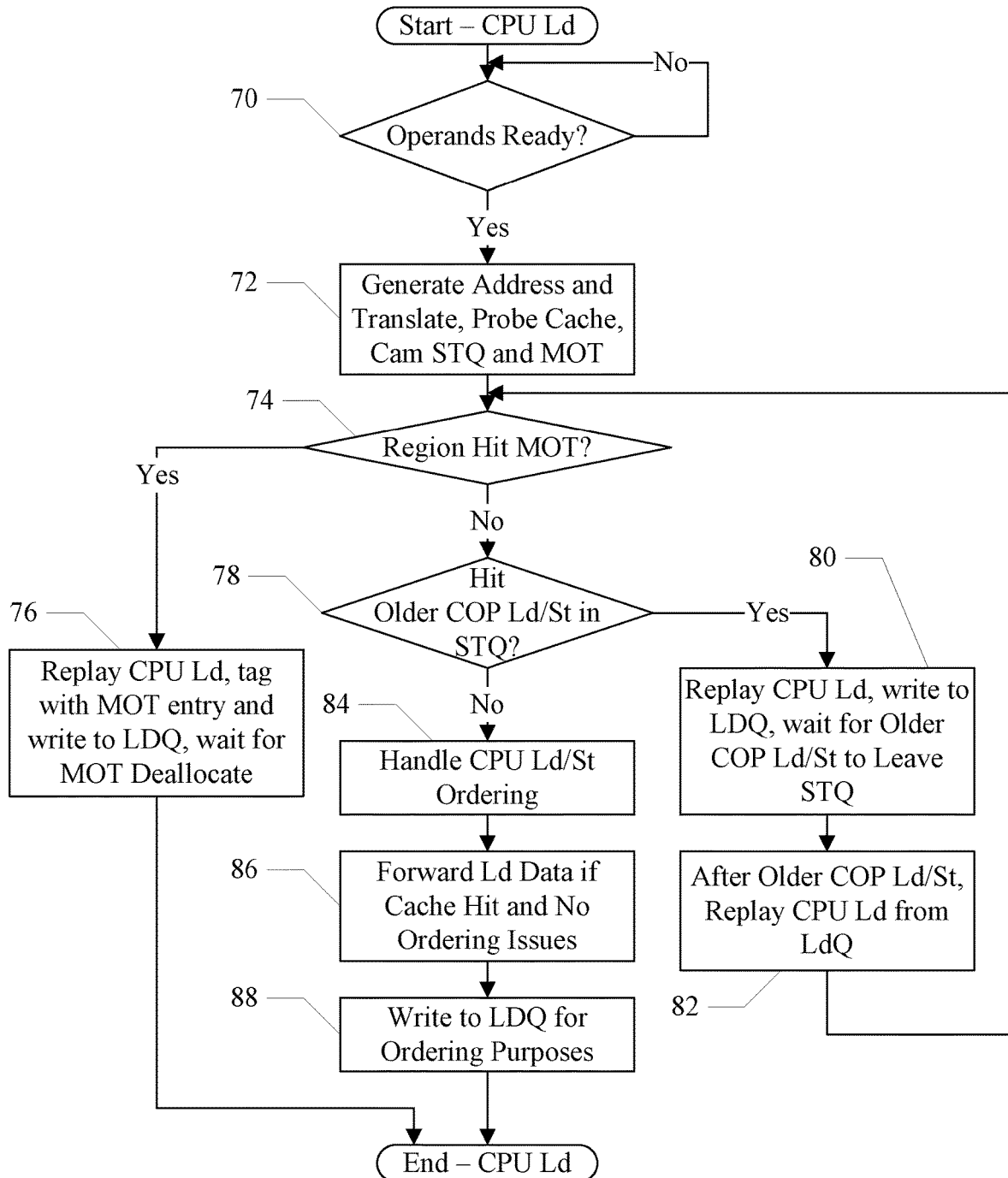
FIG. 4 is a flowchart illustrating operation of one embodiment of the CPU processor to execute a CPU load operation.

FIG. 4 is a flowchart illustrating operation of one embodiment of the CPU processor 12 to execute a CPU load operation, for one embodiment. While the blocks are shown in a particular order for ease of understanding, other orders may be used. Blocks may be performed in parallel in combinatorial logic in the CPU processor 12. Blocks, combinations of blocks, and/or the flowchart as a whole may be pipelined over multiple clock cycles. The CPU processor 12 and/or components thereof may be configured to implement the operation shown in FIG. 4.

The CPU load operation may wait in the reservation station 36 until its address operands are ready (decision block 70). Once the operands are ready (and the reservation station 36 selects the CPU load operation, if multiple operations have their operands ready), the reservation station 36 may be configured to issue the CPU load operation (decision block 70, "yes" leg). The AGU/TLB 38 may be configured to generate the address from the address operands and translate the address, and may transmit the address to the DCache 16 to probe the cache (block 72). The load/store unit 20 may also CAM the STQ 42 and the memory ordering table 40.

If the CPU load operation is a region hit in the memory ordering table 40 (decision block 74, "yes" leg), the load/store unit 20 may be configured to replay the load (cancelling any data forwarding that may be attempted from the DCache 16) (block 76). The load/store unit 20 may be configured to write the CPU load operation to the LDQ 44, tagged with the entry ID for the memory ordering table 40 entry that is hit by the CPU load operation. The CPU load operation may wait in the LDQ 44 until the memory ordering table 40 indicates a deallocation of the entry indicated by the entry ID.

If the CPU load operation is not a region hit in the memory ordering table 40 (decision block 74, "no" leg) but is a region hit on an older coprocessor load/store operation in the STQ 42 (decision block 78, "yes" leg), the load may also be replayed (cancelled any forwarding that may be attempted by the DCache 16) (block 80). The load/store unit 20 may be configured to write the CPU load operation to the LDQ 44, and may be configured to wait for the older coprocessor load/store operation to leave the STQ 42. In one embodiment, a similar mechanism of tagging the CPU load operation in the LDQ 44 with the entry in the STQ 42 on which it is waiting may be used. Alternatively, the CPU load operation may replay from the LDQ 44 periodically to detect if the older coprocessor load/store operation has left the STQ 42. Once the older coprocessor load/store operation has left the STQ, the CPU load operation may replay from the LDQ 44 (block 82). The check for a hit in the memory ordering table 40 may be performed again, and may be a hit if the CPU load operation is replayed before the older coprocessor load/store operation has completed (decision block 74).

If the CPU load operation is not a region hit in the memory ordering table 40 or STQ 42 (decision blocks 74, and 78, "no" legs), the CPU processor 12 may be configured to handle any CPU load/store ordering issues, if any (block 84). If there are no ordering issues, the CPU processor 12 may be configured to forward cache hit data from the DCache 16 if a hit is detected (block 86) and the load/store unit 20 may be configured to write the CPU load operation to the LDQ 44 for ordering purposes (block 88). If the CPU load operation is a miss in the DCache 16, the CPU load operation is also in the LDQ 44 for miss processing through the CIF 34.

Figure 5:
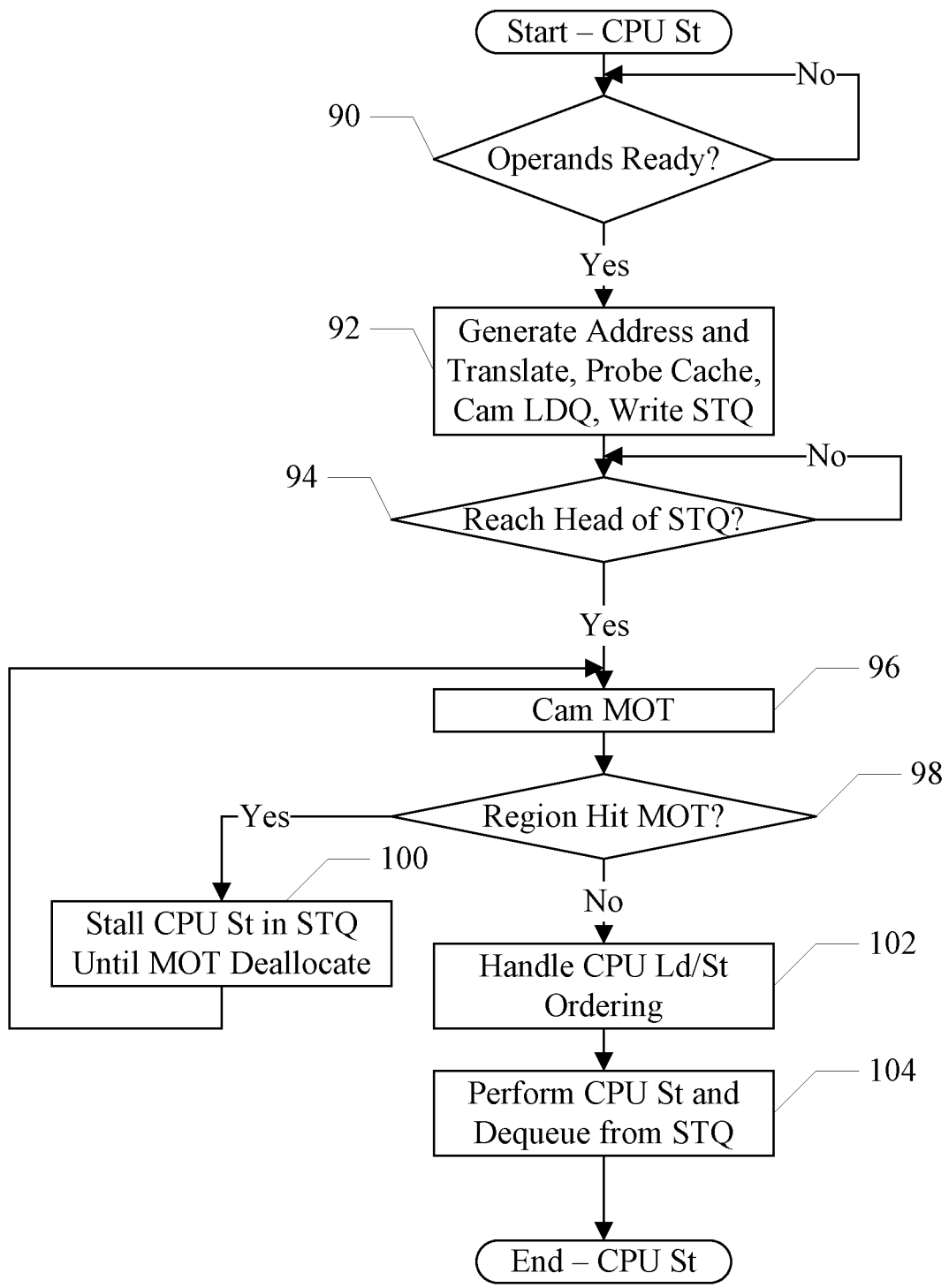
FIG. 5 is a flowchart illustrating operation of one embodiment of the CPU processor to execute a CPU store operation.

FIG. 5 is a flowchart illustrating operation of one embodiment of the CPU processor 12 to execute a CPU store operation, for one embodiment. While the blocks are shown in a particular order for ease of understanding, other orders may be used. Blocks may be performed in parallel in combinatorial logic in the CPU processor 12. Blocks, combinations of blocks, and/or the flowchart as a whole may be pipelined over multiple clock cycles. The CPU processor 12 and/or components thereof may be configured to implement the operation shown in FIG. 5.

The CPU store operation may wait in the reservation station 36 until its address operands are ready (decision block 90). Once the operands are ready (and the reservation station 36 selects the CPU store operation, if multiple operations have their operands ready), the reservation station 36 may be configured to issue the CPU store operation (decision block 90, "yes" leg). The AGU/TLB 38 may be configured to generate the address from the address operands and translate the address, and may transmit the address to the DCache 16 to probe the cache (block 92). The load/store unit 20 may also be configured to CAM the LDQ 44. The CAM of the LDQ 44 may detect any younger CPU load operations to overlapping addresses that have forwarded data, causing the younger CPU load operations to be flushed. The load/store unit 20 may be configured to write the CPU store operation to the STQ 42.

The CPU store operation may wait in the STQ 42 until it is the oldest operation in the STQ 42, reaching the head of the STQ 42 (decision block 94, "yes" leg). The load/store unit 20 may be configured to CAM the memory ordering table 40 (block 96), and if there is a region hit in the memory ordering table 40 (decision block 98, "yes" leg), the load/store unit 20 may stall the CPU store operation in the STQ 42 until the region hit clears (block 100). The stall may be effected by continuing to CAM the memory ordering table 40, or by tagging the STQ entry with the ID of the hitting entry in the memory ordering table 40. Once the region hit is cleared, any CPU load/store ordering issues are completed (decision block 98, "no" leg and block 102), and the CPU store operation is non-speculative (previous branch and instruction-exception causing instructions are resolved), the CPU store operation may be performed from the STQ 42 and may dequeue from the STQ 42 (block 104). If the CPU store operation is a hit in the DCache 16, the CPU store operation may write the DCache 16 and may be complete. It is possible that a coherence operation may be needed to obtain write permission to the cache line, which may be handled as well. If the CPU operation is a miss or is non-cacheable, it may be written to the CIF 34 for transmission to the L2 cache 14 and/or to the main memory system.

Figure 6:
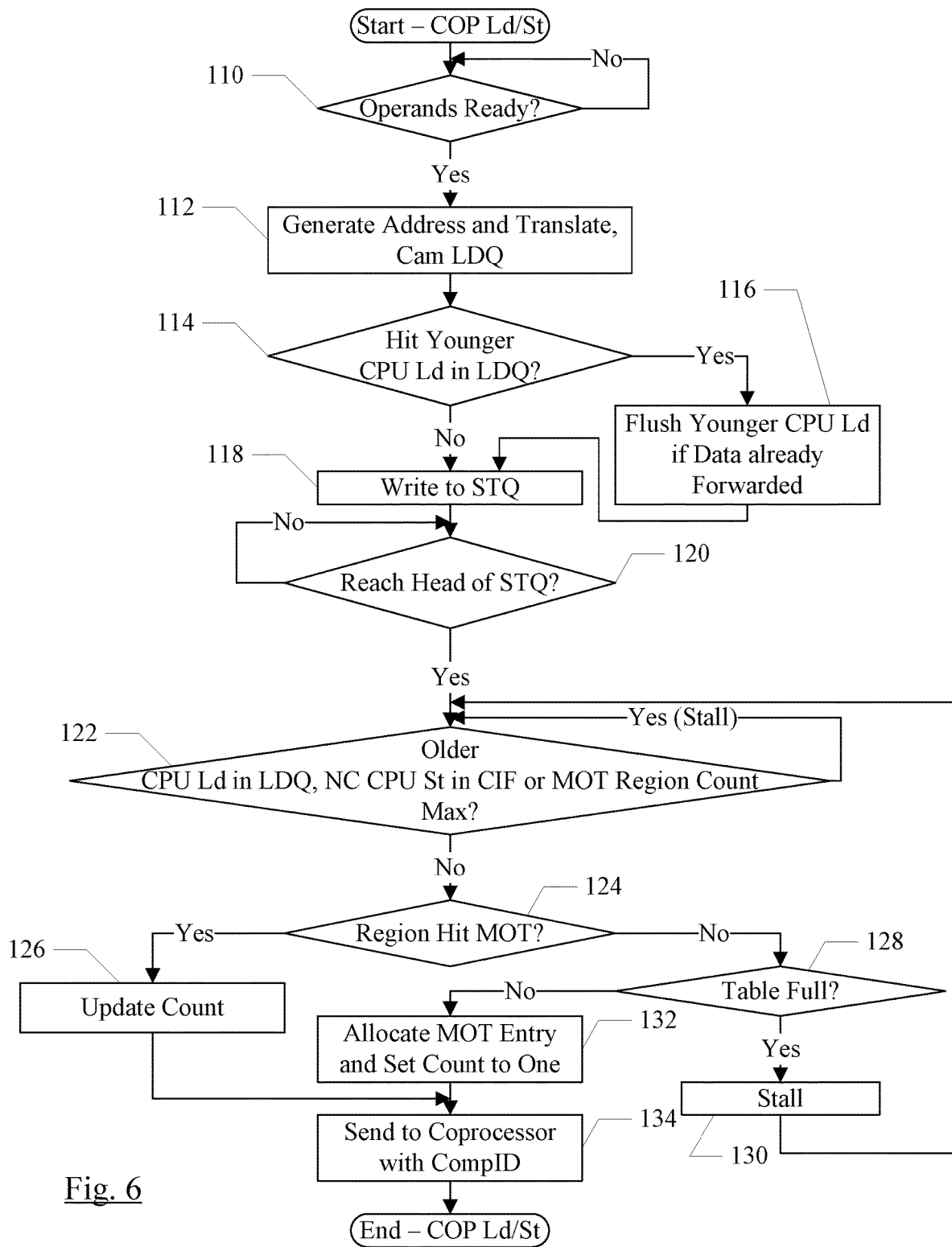
FIG. 6 is a flowchart illustrating operation of one embodiment of the CPU processor to execute a coprocessor load/store operation.

FIG. 6 is a flowchart illustrating operation of one embodiment of the CPU processor 12 to execute a coprocessor load/store operation, for one embodiment. While the blocks are shown in a particular order for ease of understanding, other orders may be used. Blocks may be performed in parallel in combinatorial logic in the CPU processor 12. Blocks, combinations of blocks, and/or the flowchart as a whole may be pipelined over multiple clock cycles. The CPU processor 12 and/or components thereof may be configured to implement the operation shown in FIG. 6.

The coprocessor load/store operation may wait in the reservation station 36 until its address operands are ready (decision block 110). Once the operands are ready (and the reservation station 36 selects the coprocessor load/store operation, if multiple operations have their operands ready), the reservation station 36 may be configured to issue the coprocessor load/store operation (decision block 110, "yes" leg). The AGU/TLB 38 may be configured to generate the address from the address operands and translate the address (block 112). However, for coprocessor load/store operations, the DCache 16 may not be probed. If the DCache 16 contains the cache line accessed by the coprocessor load/store operation, the L2 cache 14 may be configured to manage the transfer of the data via a back snoop or similar operation, as mentioned previously. The load/store unit 20 may also be configured to CAM the LDQ 44. The CAM of the LDQ 44 may detect any younger CPU load operations to the same memory region that have forwarded data, causing the younger CPU load operations to be flushed (decision block 114 "yes" leg and block 116). The load/store unit 20 may be configured to write the coprocessor load/store operation to the STQ 42 (block 118).

Similar to the CPU store operation above, the coprocessor load/store operation may wait in the STQ 42 until it is the oldest operation in the STQ 42, reaching the head of the STQ 42 (decision block 120, "yes" leg). Once the coprocessor load/store operation has reached the head of the STQ 42, it may be stalled if there is an older CPU load operation in the LDQ 44 to the same memory region as the coprocessor load/store operation, if there is a non-cacheable store in the CIF 34 (or a store miss in the CIF 34), or if there is a region count in the memory ordering table 40 that is reaching its maximum (e.g. one away from the maximum) (decision block 122). The region count may be for region addressed by the coprocessor load/store operation, or any region count in the memory ordering table 40, in various embodiments. The region count may not be permitted to overflow using this mechanism. Similar to the CPU store operation, the load/store unit 20 may also be configured to stall until preceding branch and exception-causing instructions have resolved to ensure that the coprocessor load/store operations are non-speculative.

If there are no stalling conditions (decision block 122, "no" leg), the load/store unit 20 may be configured to CAM the memory ordering table 40. If the coprocessor load/store operation is a region hit in the memory ordering table 40 (decision block 124, "yes" leg), the memory ordering table 40 may update the op count in the hitting entry (incrementing the op count) (block 126) and may transmit the entry ID for the hitting entry as the completion ID with the coprocessor load/store operation to the coprocessor 10 (through the CIF 34-block 134).

If the coprocessor load/store operation is a miss in the memory ordering table 40 (decision block 124, "no" leg) and the memory ordering table 40 is full (no free entries) (decision block 128, "yes" leg), the load/store unit 20 may be configured to continue to stall the coprocessor load/store operation as the region containing its address cannot be tracked in the memory ordering table 40 (block 130, returning to decision block 122). If the table is not full (decision block 128, "no" leg), the load/store unit 20 may allocate a memory ordering table entry to the region, updating the entry with the region address and initializing the count to one (block 132). The load/store unit 20 may be configured to transmit the entry ID of the allocated entry as the completion ID with the coprocessor load/store operation to the coprocessor 10 (through the CIF 34-block 134).

Figure 7:
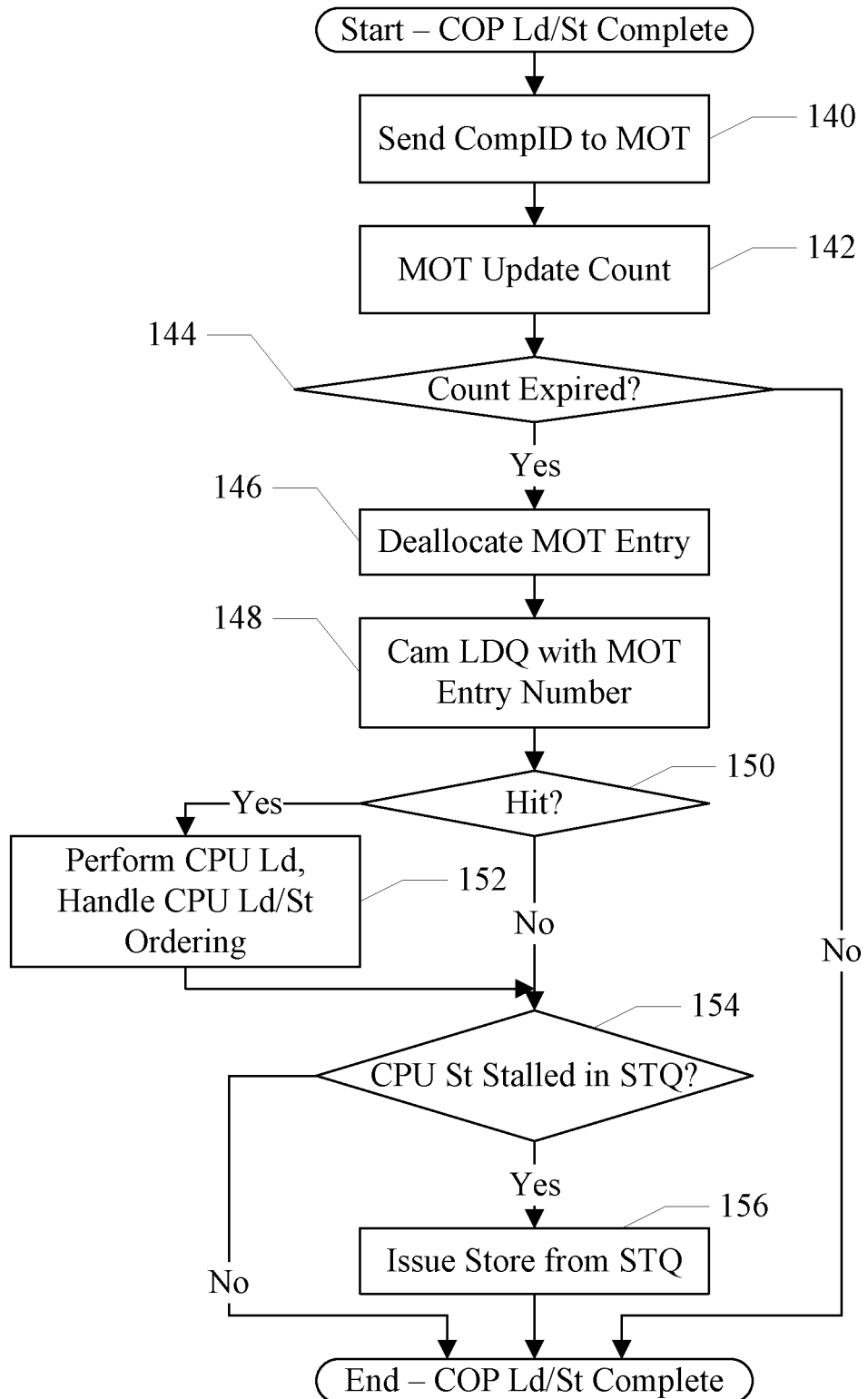
FIG. 7 is a flowchart illustrating operation of one embodiment of the coprocessor and the CPU processor to complete a coprocessor load/store operation.

FIG. 7 is a flowchart illustrating operation of one embodiment of the CPU processor 12, the L2 cache 14, and the coprocessor 10 to complete a coprocessor load/store operation, for one embodiment. While the blocks are shown in a particular order for ease of understanding, other orders may be used. Blocks may be performed in parallel in combinatorial logic in the CPU processor 12 and/or coprocessor 10. Blocks, combinations of blocks, and/or the flowchart as a whole may be pipelined over multiple clock cycles. The CPU processor 12, the L2 cache 14, and the coprocessor 10 and/or components thereof may be configured to implement the operation shown in FIG. 7.

The coprocessor 10 (and more particularly the memory access interface circuit 32) may be configured to send the completion ID with the coprocessor load/store operation to the L2 cache 14 when executing the coprocessor load/store operation. The L2 cache 14 may be configured to complete the coprocessor load/store operation, including any backsnoop or other coherence activities associated with the coprocessor load/store operation, if any. The L2 cache 14 may be configured to return the completion ID to the memory ordering table 40 (through the CIF 34, in an embodiment) (block 140). The memory ordering table 40 may be configured to update the op count in the entry identified by the completion ID (decrementing the count) (block 142). If the count has not expired (e.g. reached zero) (decision block 144, "no" leg), no additional action is performed as there are still one or more outstanding coprocessor load/store operations to the memory region. If the count has expired (reached zero) (decision block 144, "yes" leg), the memory ordering table 40 may be configured to deallocate the entry (block 146). The memory ordering table 40 may be configured to transmit the ID of the deallocated entry as the deallocation ID to the LDQ 44, which may CAM the deallocation ID against entry IDs stored in the LDQ 44 for retried CPU load operations (block 148). If there is a hit on one or more LDQ 44 entries (decision block 150, "yes" leg), the LDQ 44 may perform the CPU load operations from the entries (block 152). CPU load/store ordering issues may be handled, if any, to complete the CPU load operation. Additionally, if there is a CPU store operation stalled in the STQ 42 awaiting the deallocation (decision block 154, "yes" leg), the CPU store operation may be issued from the STQ 42 (block 156).

Figure 8:
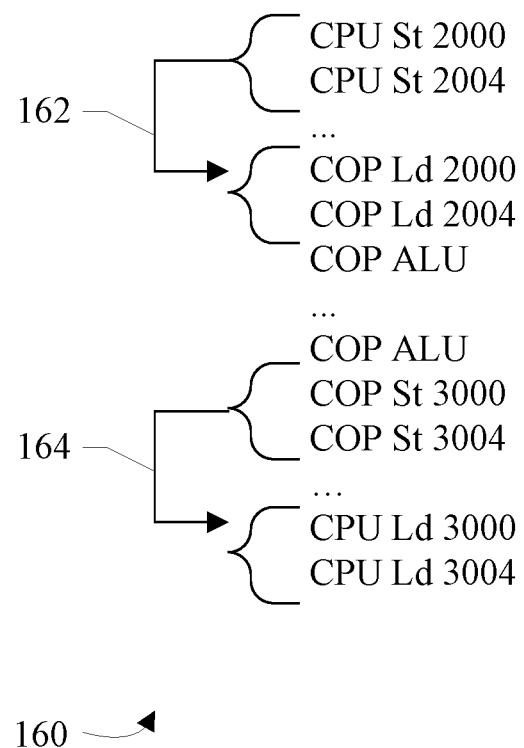
FIG. 8 is a block diagram illustrating an exemplary instruction sequence including CPU load/store operations and coprocessor load/store operations.

FIG. 8 is a block diagram illustrating an exemplary instruction sequence 160 that may be executed by the CPU processor 12 and the coprocessor 10. The program order of the sequence 160 may be from top to bottom in FIG. 8. The code sequence 160 illustrates that a mix of CPU instructions/operations and coprocessor instructions/operations may be included in a given code sequence. CPU store operations may be used to initialize memory locations with data for the coprocessor 10 (e.g. addresses 2000, 2004). Subsequently, coprocessor load operations to those same addresses may be used to read the data into the coprocessor 10. As indicated by the arrow 162, the CPU store operations are to the same region as the coprocessor load operations and would create an ordering stall. This ordering may be handled by the STQ 42. Various coprocessor computation operations (ALU) may be performed on the data. Coprocessor store operations may be then be used to write the results to memory (e.g. addresses 3000, 3004, etc.). CPU load operations may be used to read the data and process the results further in the CPU processor 12. As indicated by the arrow 164, the coprocessor store operations are in the same memory region as the CPU load operations and thus create an ordering stall if still pending. This ordering may be handled by the memory ordering table 40.

Figure 9:
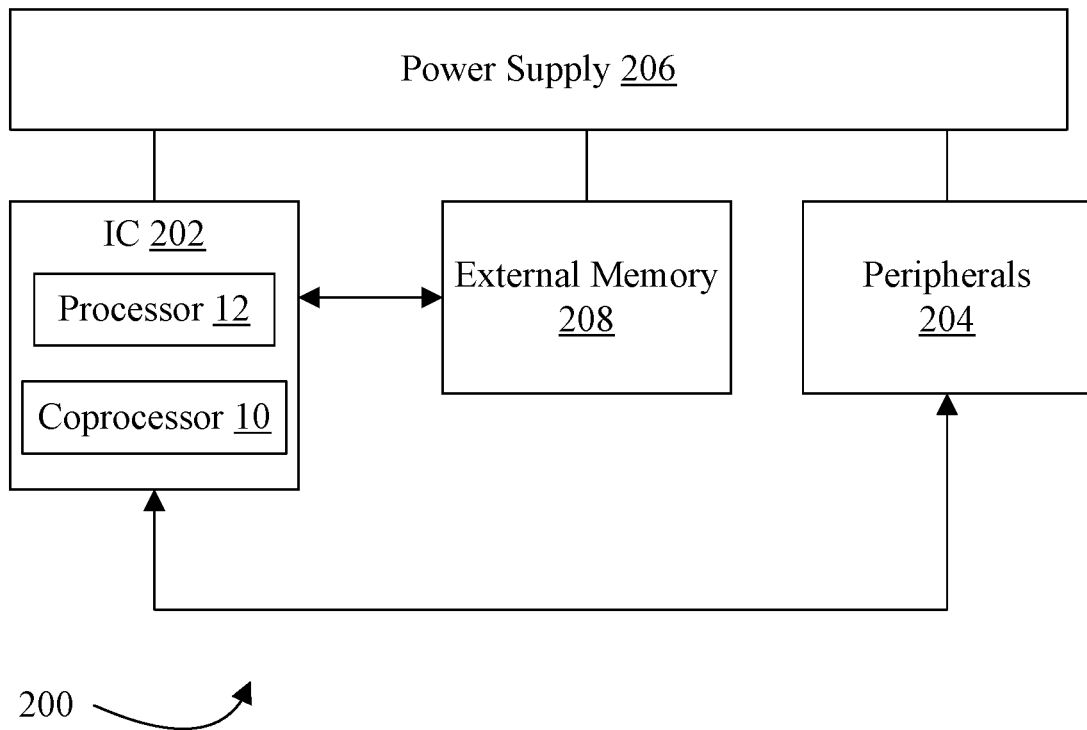
FIG. 9 is a block diagram illustrating one embodiment of a system including the processor and coprocessor shown in FIG. 1.

FIG. 9 is a block diagram of one embodiment of a system 200. In the illustrated embodiment, the system 200 includes at least one instance of an integrated circuit (IC) 202 coupled to one or more peripherals 204 and an external memory 208. A power supply 206 is provided which supplies the supply voltages to the IC 202 as well as one or more supply voltages to the memory 208 and/or the peripherals 204. The IC 202 may include one or more instances of the CPU processor 12 and one or more instances of the coprocessor 10. In other embodiments, multiple ICs may be provided with instances of the CPU processor 12 and/or the coprocessor 10 on them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device capable of benefitting from the coprocessor 10 (e.g., neural networks, LSTM networks, other machine learning engines including devices that implement machine learning, etc.). In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

The external memory 208 may include any type of memory. For example, the external memory 208 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 208 may include one or more memory modules to which the memory devices are mounted, such as single inline memory modules (SIMMs), dual inline memory modules (DIMMs), etc. Alternatively, the external memory 208 may include one or more memory devices that are mounted on the IC 202 in a chip-on-chip or package-on-package implementation.

Figure 10:
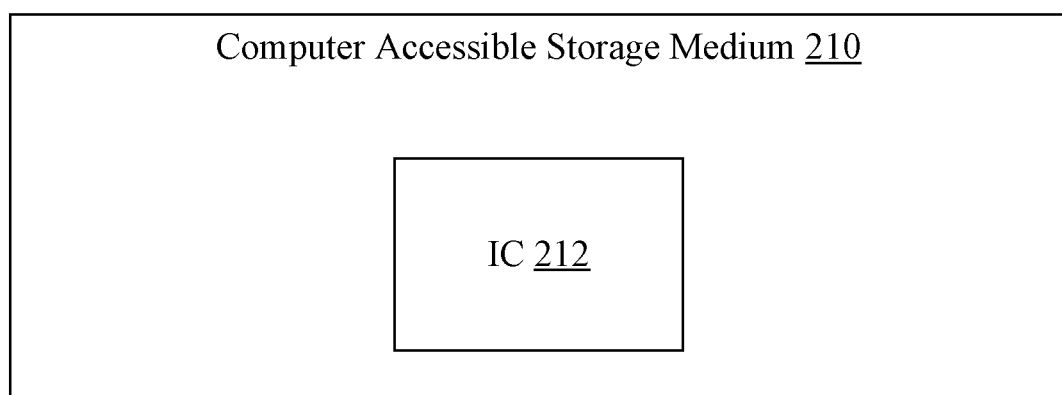
FIG. 10 is a block diagram of one embodiment of a computer accessible storage medium.

FIG. 10 is a block diagram of one embodiment of a computer accessible storage medium 210 is shown storing an electronic description of the IC 202 (reference numeral 212). More particularly, the description may include at least the coprocessor 10 and/or the CPU processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 210 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 212 of the IC 202 stored on the computer accessible storage medium 210 may be a database which can be read by a program and used, directly or indirectly, to fabricate the hardware comprising the IC 202. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 202. The netlist may then be placed and routed to produce a data set describing geometric shapes to be applied to masks. The masks may then be used in various semiconductor fabrication steps to produce a semiconductor circuit or circuits corresponding to the IC 202. Alternatively, the description 212 on the computer accessible storage medium 210 may be the netlist (with or without the synthesis library) or the data set, as desired.

While the computer accessible storage medium 210 stores a description 212 of the IC 202, other embodiments may store a description 212 of any portion of the IC 202, as desired (e.g. the coprocessor 10 and/or the CPU processor 12, as mentioned above).

Figure 11:
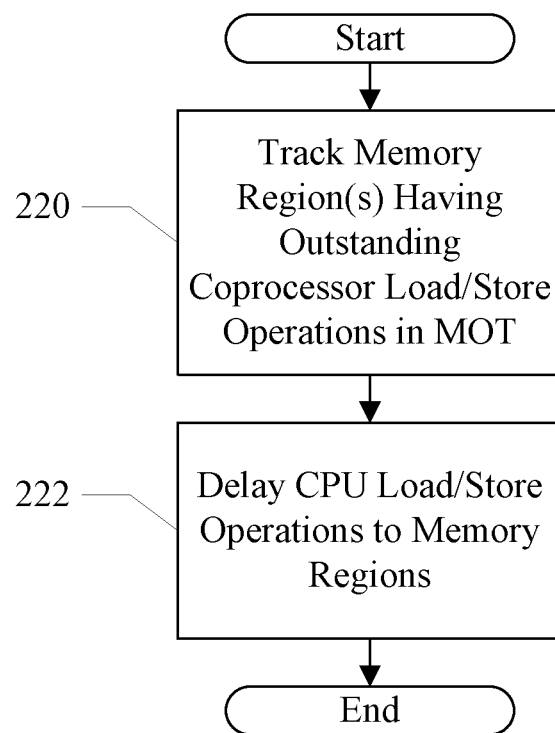
FIG. 11 is a flowchart illustrating one embodiment of a method for ordering CPU load/store operations and coprocessor load/store operations using a memory ordering table.

FIG. 11 is a flowchart illustrating one embodiment of a method for ordering CPU load/store operations and coprocessor load/store operations using a memory ordering table such as the memory ordering table 40. While the blocks are shown in a particular order for ease of understanding, other orders may be used. Blocks may be performed in parallel in combinatorial logic in the CPU processor 12 and/or coprocessor 10. Blocks, combinations of blocks, and/or the flowchart as a whole may be pipelined over multiple clock cycles.

The CPU processor 12, and more particularly the load/store unit 20, may be configured to track one or more memory regions having outstanding coprocessor load/store operations in the memory ordering table 40 (block 220). That is, the memory regions may each have one or more coprocessor load/store operations that have been issued by the load/store unit 20 but which have not yet been completed by the coprocessor 10/L2 cache 14. For example, in one embodiment, the memory ordering table 40 may include an operation count that is incremented at each issuance of a coprocessor load/store operation and that is decremented at each completion of a coprocessor load/store operation. When the count reaches zero, the memory region may be deallocated from the memory ordering table 40. The CPU processor 12, and more particularly the load/store unit 20, may be configured to delay CPU load/store operations to the memory regions tracked in the memory ordering table 40 (block 222).

Numerous variations and modifications will become apparent to those skilled in the art once the above disclosure is fully appreciated. It is intended that the following claims be interpreted to embrace all such variations and modifications.

What is claimed is:

1. An apparatus comprising:
at least one central processing unit (CPU) processor configured to execute CPU instructions including CPU load/store operations;
at least one coprocessor coupled to the at least one CPU processor and configured to execute coprocessor operations, including coprocessor load/store operations, wherein code sequences executed by the at least one CPU processor and the at least one coprocessor include intermixed CPU instructions and coprocessor operations;
the at least one CPU processor is configured to issue coprocessor operations, including coprocessor load/store operations, to the at least one coprocessor;
the at least one CPU processor includes a memory ordering table configured to track at least one memory region accessed by coprocessor load/store operations that have been issued to the at least one coprocessor and that have not yet been completed by the at least one coprocessor, wherein the memory ordering table is configured to store a respective count of a number of issued and non-completed coprocessor load/store operations within the at least one memory region; and
the at least one CPU processor is configured to prevent execution of CPU load/store operations to addresses within the at least one memory region tracked by the memory ordering table responsive to the memory ordering table indicating there is at least one issued and uncompleted coprocessor load/store operation to the at least one memory region.

2. The apparatus as recited in claim 1 wherein the at least one CPU processor is configured to generate addresses that are accessed by the issued coprocessor load/store operations prior to issuance of the coprocessor load/store operations issued to the at least one coprocessor.

3. The apparatus as recited in claim 2 wherein the at least one CPU processor is configured to update the memory ordering table responsive to the addresses generated by the at least one CPU processor for the issued coprocessor load/store operations.

4. The apparatus as recited in claim 1 wherein the at least one CPU processor is configured to store a first region address identifying a first memory region in the memory ordering table.

5. The apparatus as recited in claim 4 wherein the at least one CPU processor is configured to increment a first count in the memory ordering table-responsive to issuing a first coprocessor load/store operation to the at least one coprocessor, the first coprocessor load/store operation having a first address within the first memory region, wherein the first count corresponds to the first memory region.

6. The apparatus as recited in claim 5 wherein the at least one CPU processor is configured to receive an identifier corresponding to the first coprocessor load/store operation responsive to completion of the first coprocessor load/store operation, and wherein the at least one CPU processor is configured to decrement the first count responsive to the identifier.

7. The apparatus as recited in claim 6 wherein the identifier locates a first entry in the memory ordering table that is storing the first count and the first region address.

8. The apparatus as recited in claim 6 further comprising a cache that is shared by the at least one CPU processor and the at least one coprocessor, wherein the cache is configured to receive the identifier from the at least one coprocessor with the first coprocessor load/store operation, and wherein the cache is configured to return the identifier to the at least one CPU processor responsive to completing the first coprocessor load/store operation.

9. The apparatus as recited in claim 5 wherein the at least one CPU processor is configured to deallocate the first memory region from the memory ordering table responsive to the first count reaching zero, and wherein the at least one CPU processor is configured to permit the execution of CPU load/store operations to the first memory region responsive to deallocating the first memory region from the memory ordering table.

10. The apparatus as recited in claim 1 wherein a first memory region in the memory ordering table comprises a plurality of cache lines.

11. The apparatus as recited in claim 1 wherein a first memory region in the memory ordering table comprises a page.

12. A system comprising a coprocessor and a central processing unit (CPU) processor comprising a load/store unit, the load/store unit comprising:
   a queue configured to store one or more coprocessor load/store operations to be executed by the coprocessor to which the CPU processor is coupled during use, wherein the CPU processor is configured to execute CPU instructions including CPU load/store operations, and wherein code sequences executed by the CPU processor and the coprocessor include intermixed CPU instructions and coprocessor operations; and
   a memory ordering table coupled to the queue, wherein the memory ordering table is configured to track one or more memory regions to which the one or more coprocessor load/store operations have been issued to the coprocessor by the CPU processor and which are not yet complete by the coprocessor, and wherein the memory ordering table is further configured to store a respective count of a number of issued and non-completed coprocessor load/store operations for each of the one or more memory regions; and
   the load/store unit is configured to prevent CPU processor load/store operations to addresses within the one or more memory regions tracked by the memory ordering table from executing.

13. The system as recited in claim 12 wherein load/store unit is configured to generate addresses that are accessed by the one or more issued coprocessor load/store operations prior to issuance of the one or more issued coprocessor load/store operations to the coprocessor, and the load/store unit is configured to update the memory ordering table responsive to the addresses generated by the CPU processor for the coprocessor load/store operations issued to the coprocessor.

14. The system as recited in claim 12 wherein the load/store unit is configured to issue a first coprocessor load/store operation from the queue and to update a first count corresponding to a first memory region of the one or more memory regions, wherein the first memory region that-includes a first address accessed by the first coprocessor load/store operation.

15. The system as recited in claim 14 wherein the load/store unit is configured to receive an identifier corresponding to the first coprocessor load/store operation responsive to completion of the first coprocessor load/store operation, and wherein the load/store unit is configured to update the first count responsive to the identifier.

16. The system as recited in claim 14 wherein each of the one or more memory regions comprises a page.

17. A method comprising:
   executing CPU instructions including CPU load/store operations in at least one CPU processor;
   executing coprocessor operations in at least one coprocessor coupled to the at least one CPU processor, the coprocessor operations including coprocessor load/store operations, wherein code sequences executed by the at least one CPU processor and the at least one coprocessor include intermixed CPU instructions and coprocessor operations;
   issuing coprocessor operations, including coprocessor load/store operations, to the at least one coprocessor by the at least one CPU processor;
   tracking at least one memory region accessed by coprocessor load/store operations that have been issued to the at least one coprocessor and that have not yet been completed by the at least one coprocessor in a memory ordering table in the at least CPU processor;
   storing a respective count of the number of issued and non-completed coprocessor load/store operations within the at least one memory region in the memory ordering table; and
   preventing, in the at least one CPU processor, execution of CPU load/store operations to addresses within the at least one memory region tracked by the memory ordering table responsive to the memory ordering table indicating there is at least one issued and uncompleted coprocessor load/store operation to the at least one memory region.

18. The method as recited in claim 17 further comprising incrementing, by the at least one CPU processor, a first count in the memory ordering table responsive to issuing a first coprocessor load/store operation to the at least one coprocessor, the first coprocessor load/store operation having a first address within a first memory region in the memory ordering table, and wherein the first count corresponds to the first memory region.

19. The method as recited in claim 18 further comprising:
   receiving, by the at least one CPU processor, an identifier corresponding to the first coprocessor load/store operation responsive to completion of the first coprocessor load/store operation, and
   decrementing, by the at least one CPU processor, the first count responsive to the identifier.

20. The method as recited in claim 19 wherein the identifier locates a first entry in the memory ordering table that is storing the first count and a first region address identifying the first memory region.

* * * * *

UNITED STATES PATENT AND TRADEMARK OFFICE
CERTIFICATE OF CORRECTION

PATENT NO. : 10,776,125 B2
APPLICATION NO. : 16/210231
DATED : September 15, 2020
INVENTOR(S) : Aditya Kesiraju, Brett S. Feero and Nikhil Gupta Page 1 of 1

It is certified that error appears in the above-identified patent and that said Letters Patent is hereby corrected as shown below:

In the Specification

Column 5    Line 26    Please delete: "CIF to 34" and insert --CIF 34--.

Column 13   Line 51    Please delete: "LDQ 42" and insert --LDQ 44--.

Signed and Sealed this
Twenty-seventh Day of October, 2020

Andrei Iancu
*Director of the United States Patent and Trademark Office*